(12) United States Patent
Mukherjee et al.

(10) Patent No.: US 11,071,036 B2
(45) Date of Patent: Jul. 20, 2021

(54) MANAGING VOICE CALLS IN HETEROGENOUS NETWORK ENVIRONMENTS

(71) Applicant: Cisco Technology, Inc, San Jose, CA (US)

(72) Inventors: Subrata Mukherjee, Plano, TX (US); Irfan Ali, Palo Alto, CA (US)

(73) Assignee: Cisco Techneiogy, Inc., San Jose, CA (US)

( * ) Notice: Subject to any disclaimer, the term of this patent is extended or adjusted under 35 U.S.C. 154(b) by 83 days.

(21) Appl. No.: 16/662,275

(22) Filed: Oct. 24, 2019

(65) Prior Publication Data

US 2021/0127314 A1    Apr. 29, 2021

(51) Int. Cl.
| | |
|---|---|
| *H04W 36/34* | (2009.01) |
| *H04W 60/00* | (2009.01) |
| *H04W 36/30* | (2009.01) |
| *H04W 36/14* | (2009.01) |
| *H04W 60/06* | (2009.01) |

(52) U.S. Cl.
CPC ........... *H04W 36/34* (2013.01); *H04W 36/14* (2013.01); *H04W 36/30* (2013.01); *H04W 60/005* (2013.01); *H04W 60/06* (2013.01)

(58) Field of Classification Search
CPC ..... H04W 36/34; H04W 36/14; H04W 36/30; H04W 60/06; H04W 60/005
See application file for complete search history.

(56) References Cited

U.S. PATENT DOCUMENTS

| | | | | |
|---|---|---|---|---|
| 2020/0288367 | A1* | 9/2020 | Kim | H04W 36/00 |
| 2021/0051529 | A1* | 2/2021 | Yuan | H04W 28/20 |
| 2021/0051530 | A1* | 2/2021 | Venkataraman | H04M 7/006 |

OTHER PUBLICATIONS

"Vo5G Technical White Paper" by Huawei Technologies Co., Ltd, Jul. 2018 (web accessible at https://www.huawei.com/en/industry-insights/technology/vo5g-technical-white-paper)—Jul. 2016.
"3GPP Technical Specification 23.502 V16.1.1", Jun. 2019, Excerpted portion including Section 4, Subsection13—Jun. 2019.
PCT Notification of Transmittal of the International Search Report and The Written Opinion of the International Searching Authority, or the Declaration with attached International Search Report and Written Opinion of the International Searching Authority in International Application No. PCT/US2020/055454, dated Jan. 28, 2021, 20 pgs.

(Continued)

*Primary Examiner* — Marisol Figueroa
(74) *Attorney, Agent, or Firm* — Baker Botts, LLP

(57) ABSTRACT

A method is provided for handling a voice call in a heterogeneous network environment by a wireless device. The method includes sending a registration request to a network node in a Next Generation (5G) network. The wireless device has an existing voice call on a different network in the heterogeneous network environment. The method further includes receiving a registration acceptance from the network node in the 5G network. The registration acceptance indicates that IMS voice services are supported, but existing voice calls are not supported. The method further includes determining to stop an attempt to move the existing voice call to the 5G network.

28 Claims, 6 Drawing Sheets

(56) References Cited

OTHER PUBLICATIONS

"Discussion on EPS/RAT fallback for IMS voice over ePDG/N3WIF," S2-1909620, 3GPP TSG-SA2 Meeting #135, LG Electronics, Oct. 14-18, 2019, 4 pgs.
"Indication whether IMS voice over PS session is supported only through EPS-fallback or RAT-fallback," S2-1909669, SA WG2 Meeting #135, Apple, Oct. 14-18, 2019, 3 pgs.
"TS 23.501: EPS Fallback for voice," S2-178544, SA WGS Meeting #124, Ericsson, Nov. 27-Dec. 1, 2017, 4 pgs.
Support of VoWiFi handover with EPS/RAT fallback (UE based solution), S2-1909682, 3GPP TSG-SA2 Meeting #135, LG Electronics, Oct. 14-18, 2019, 3 pgs.
"Support of VoWiFi handover with EPS/RAT fallback (NW based solution)," S2-1909685, 3GPPTSG-SA2 Meeting #135, LG Electronics, Oct. 14-18, 2019, 4 pgs.

* cited by examiner

MANAGING VOICE CALLS IN HETEROGENOUS NETWORK ENVIRONMENTS

TECHNICAL FIELD

Certain embodiments of the present disclosure relate, in general, to wireless communications systems, and, in particular, to handling voice calls in wireless networks.

BACKGROUND

In certain coverage areas, a wireless device may have access to network resources on more than one type of network. Additionally, the wireless device may determine that another network in this heterogenous network environment may provide better quality of service for data communication, e.g., on a voice call. This may be especially common when the wireless device is moving to a different location where coverage of the networks is stronger or weaker, respectively. Accordingly, the wireless device may want to transfer an existing connection, media stream, or voice call to the higher-quality network. Each type of network, such as a WIFI, a Long-Term Evolution (LTE/4G), or a New Radio (5G NR) network, may have its own procedures and capabilities for handling such a transfer.

BRIEF DESCRIPTION OF THE DRAWINGS

For a more complete understanding of the disclosed embodiments and their features and advantages, reference is now made to the following description, taking in conjunction with the accompanying drawings, in which.

DESCRIPTION OF EXAMPLE EMBODIMENTS

Overview

Figure 1:
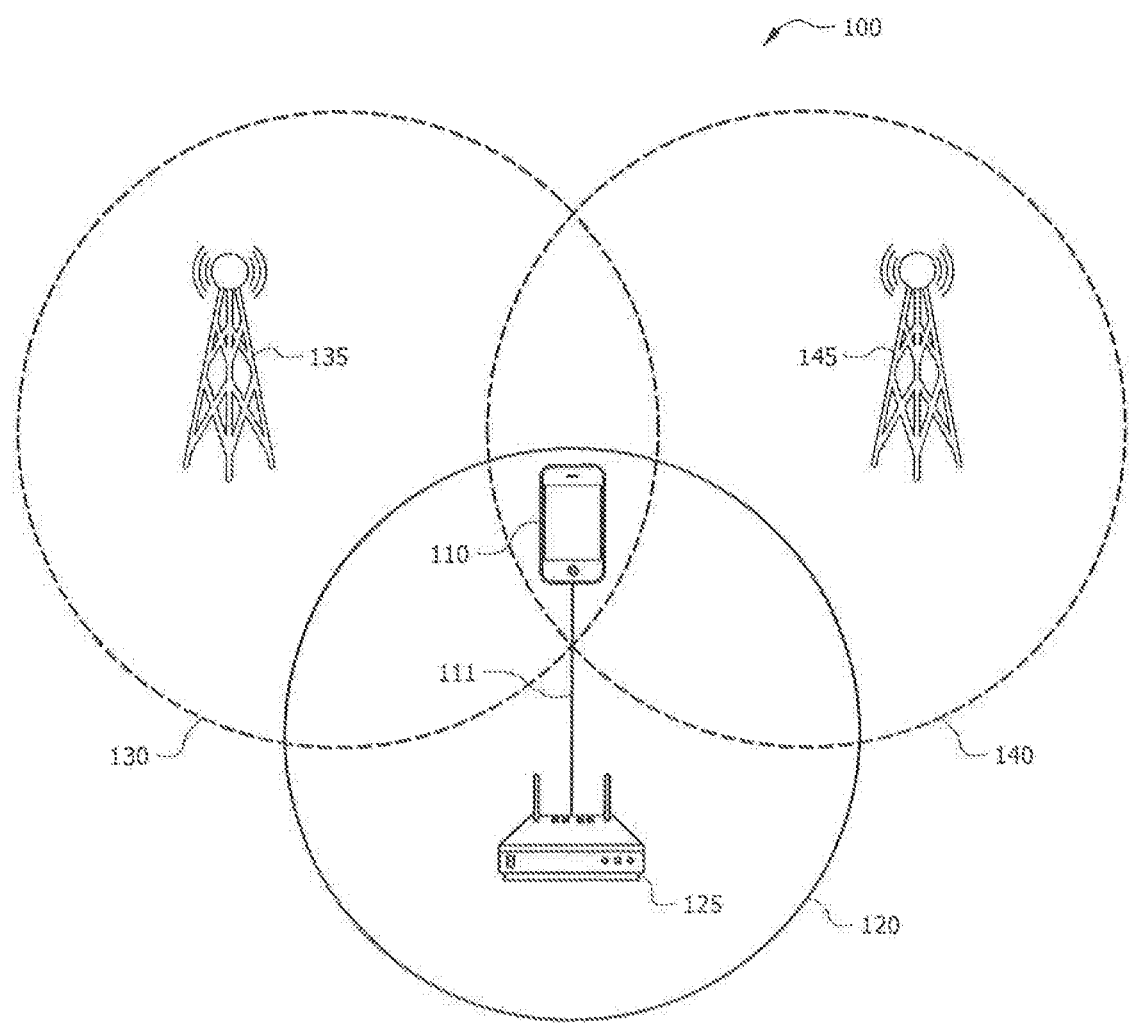
FIG. 1 illustrates an example heterogenous network environment including coverage of a plurality of different wireless networks, in accordance with certain embodiments.

According to an embodiment, a method is provided for handling a voice call in a heterogeneous network environment by a wireless device. The method includes sending a registration request to a network node in a Next Generation (5G) network. The wireless device has an existing voice call on a different network in the heterogeneous network environment. The method further includes receiving a registration acceptance from the network node in the 5G network. The registration acceptance indicates that IMS voice services are supported, but existing voice calls axe not supported. The method further includes determining to stop an attempt to move the existing voice call to the 5G network.

EXAMPLE EMBODIMENTS

Embodiments of the present disclosure and its advantages are best understood by referring to FIGS. 1 through 7 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

Current standards for Next Generation (5G/NR) networks have contemplated support for fallback to the evolved packet system (EPS), e.g., as used in 3G and 4G/LTE networks, for IP Multimedia Subsystem (IMS) voice. In particular, when the 5G radio access network (RAN) is configured to support EPS fallback for IMS voice, each IMS Voice call (both originating and terminating) attempt (including emergency calls) that is handled in the 5G RAN may be subject to EPS fallback, if Voice over New Radio (VoNR) is not natively supported. (See, e.g., 3GPP Technical Specifications (TS) 23.502 section 4.13.6.1). Accordingly, a voice call setup in the 5G network may be moved to an overlapping 4G network when the 5G RAN does not support native VoNR. Following EPS Fallback, the voice call may be established in the 4G network as a Voice over LTE (VoLTE) call. This mechanism may be applicable for mobile originating IMS voice calls, mobile terminating IMS voice calls, as well as emergency calls. It should be noted that EPS Fallback is triggered, however, only during voice call setup stage and is not triggered for an established call.

There are various scenarios in which the voice call is established while not in a 5G coverage area, and the wireless device later moves into the 5G coverage area e.g., as a result of user mobility. For example, a user may be at home using his home WiFi to make a voice call and during the voice call, the user decides to go somewhere and moves out of his home WiFi coverage area. In some circumstances, when the user moves out of WiFi zone, both 4G and 5G coverage may be present and available. The available 5G network may not support, however, native VoNR and instead, relies on EPS Fallback to handover the voice call to the 4G network.

Although EPS fallback may be suitable for establishing new voice calls, EPS fallback is limited to the voice call initiation stage, e.g., when the voice call is attempted while in the 5G coverage area. In the above example, the wireless device of the user is moved into an area outside the WiFi coverage on which the existing voice call has been supported to an overlapping 4G and 5G coverage area. If the wireless device detects superior 5G network quality, the wireless device may attempt to connect to the 5G network. In this case, the voice call will drop because EPS fallback would not be available at this stage of the wireless device-5G network interaction. Indeed, there are no specified techniques for handing existing voice calls by falling back to a 4G network, on which the call could have continued. As a result, voice calls may be dropped, which requires re-establishment of the dropped calls, thereby increasing signaling traffic on the system and the network load and a poor user experience. Furthermore, the additional transmission and receiving of wireless communications to re-establish the voice call may increase the power used by the wireless device and network nodes in the various overlapping networks.

Described herein are solutions addressing one or more of the technical problems identified above. For example, certain embodiments provide techniques for handling existing voice calls in network environments that include overlapping and/or changing network coverage by different types of network. As described in detail herein, one or more embodiments provided in this disclosure may include one or more technical advantages or solutions to existing technical problems. For example, certain embodiments may reduce the probability that voice calls are dropped (which results in resource and time-intensive re-establishment procedures) by providing an indication that existing voice calls are not supported in a newly-available or connected network during the network registration process. The wireless device may then stop its attempt to transfer the existing voice call to that new network and instead maintain the voice call on the currently-supporting network or attempt to transfer the voice call to a different network that supports existing voice calls. In this manner, existing voice calls may be transferred without resulting in dropped calls, which is critically important for emergency calls. Certain embodiments may have none, some, or all of the above-recited advantages. Other advantages may be readily apparent to one having skill in the art in light of the present disclosure.

Although the subject matter described herein may be implemented in any appropriate type of system using any suitable components, the embodiments disclosed herein are described in relation to a heterogenous network environment including coverage of multiple types of networks, such as the example network environment 100 illustrated in FIG. 1. For simplicity, FIG. 1 illustrates network environment 100 in which coverage of three different network types are shown. In particular, network environment 100 is shown to include 5G network coverage 130 part of a 5G radio access network (RAN), 4G/LTE network coverage 140 part of a 4G/LTE RAN, and WiFi coverage 120 part of a WiFi network. Each of 5G network coverage 130, 4G/LTE network coverage 140, and WiFi coverage 120 may be provided by one or more network nodes or access points. In the illustrated embodiment, 5G network coverage 130 is provided by at least a 5G network node 135, 4G/LTE network coverage 140 is provided by at least a 4G/LTE network node 145, and WiFi coverage 120 is provided by at least a wireless access point (WAP) 125. Although only a single network access component is shown with respect to each type of network, any number of network nodes or access points may be used to provide the respective coverage. Additionally, each of the aforementioned network nodes or access points may be further connected to other network elements, such as core network nodes, routers, gateways, etc. that may provide further network functionality and/or control.

Further, in practice, network environment 100 may further include any additional elements suitable to support communication between wireless devices or between a wireless device and another communication device, such as a landline telephone, a service provider, or any oilier network node or end device. Network environment 100 may provide communication and other types of services to one or more wireless devices to facilitate the wireless devices' access to and/or use of the services provided by, or via, the wireless network.

Wireless device 110 may be located within network environment 100. In certain embodiments, wireless device 110 may be located within the one or more of 5G network coverage 130, 4G/LTE network coverage 140, and WiFi coverage 120. Wireless device 110 may have previously established a voice call on through one of the networks. In this particular illustrated example, wireless device 110 has existing voice call 111 established within the WiFi network using WAP 125 providing WiFi coverage 120. For example, existing voice call 111 may have been established when the quality of service provided by WiFi coverage 120 was greater than in any overlapping networks (e.g., provided by 4G/LTE network coverage 140). Wireless device 110 may have moved to the illustrated location and now have available additional network options.

In either scenario, wireless device 110 may determine that it would have better coverage or quality of service within the 5G network through 5G coverage 130. For example, wireless device 110 may move away from WAP 120 and towards 5G network node 135 and fall within 5G coverage 130 while the signal quality from WAP 120 degrades. In this situation, wireless device 110 may attempt to move existing voice call 111 (and possibly any other data communications or media streams) to the 5G network through 5G network coverage 130. In certain embodiments, wireless device 110 may attempt to move existing voice call 111 to the 5G network when there is overlapping 4G/LTE network coverage 140. As described above, currently described configurations of New Radio (5G) networks may result in dropping existing voice calls, such as existing voice call 111.

Heterogenous network environment 100 may comprise and/or interface with any type of communication, telecommunication, data, cellular, and/or radio network or other similar type of system. In some embodiments, one of more of the networks in heterogenous network environment 100 may be configured to operate according to specific standards or other types of predefined rules or procedures. Thus, particular embodiments of the networks in network environment 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network environment 100 may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, network environment 100 may comprise any number of wired or wireless networks, network nodes, base stations, controllers, wireless devices, relay stations, and/or any other components or systems that may facilitate or participate in the communication of data and/or signals whether via wired or wireless connections.

As used herein, 5G network node 135, 4G/LTE network node 145, and/or WAP 125 may refer to equipment capable, configured, arranged and/or operable to communicate directly or indirectly with a wireless device, wireless access point and/or with other network nodes or equipment in the wireless network to enable and/or provide wireless access to the wireless device and/or to perform other functions (e.g., administration) in the wireless network. For example, 5G network node 135, 4G/LTE network node 145, and/or WAP 125 may include an access point (APs) (e.g., radio access points or WiFi APs), base stations (BSs) (e.g., radio base stations, Node Bs, evolved Node Bs (eNBs) and NR NodeBs (gNBs)).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/muiti-cast coordination entities (MCEs), core network nodes (e.g., MSCs, MMEs), O&M nodes, OSS nodes, SON nodes, positioning nodes (e.g., E-SMLCs), and/or MDTs. As another example, 5G network node 135, 4G/LTE network node 145, and/or WAP 125 may be a virtual network node. More generally, however, 5G network node 135, 4G/LTE network node 145, and/or WAP 125 may represent any suitable device (or group of devices) capable, configured, arranged, and/or operable to enable and/or provide a wireless device with access to a respective network on heterogeneous network environment 100 or to provide some service to a wireless device, such as wireless device 110, that has accessed the wireless network.

As used herein, wireless device 110 may include any device capable, configured, arranged and/or operable to communicate wirelessly with network nodes and/or other wireless devices. In certain embodiments, wireless device 110 includes a user equipment (UE) configured to communicate on an LTE or 5G NR network or a wireless access point configured to communicate according to one or more wireless standards, such as WiFi. Communicating wirelessly may involve transmitting and/or receiving wireless signals using electromagnetic waves, radio waves, infrared waves, and/or other types of signals suitable for conveying information through air.

Examples of wireless device 110 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

Figure 2:
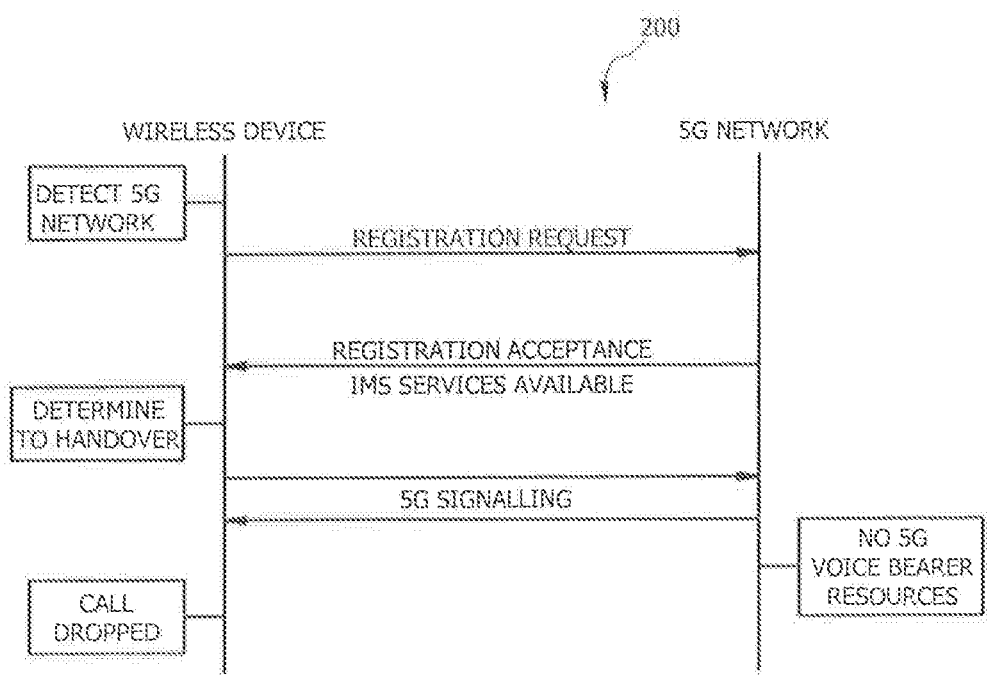
FIG. 2 illustrates a first example signaling diagram between a wireless device involving an attempt to transfer an existing voice call to a new network, in accordance with certain embodiments.

FIG. 2 illustrates a first example signaling diagram 200 between a wireless device, such as wireless device 110 and a 5G network, according to certain embodiments. In certain embodiments, signaling diagram 200 illustrates the attempt by the wireless device, to move an existing voice call, such as existing voice call 111, from another network to a 5G network, such as the 5G network which access is provided through 5G network coverage 130 via 5G network node 135. At a first instance, the wireless device may detect the presence of the 5G network coverage. For example, the wireless device may move away from coverage of the other network, e.g., a WiFi network, and into another area in which the 5G network is covered. In some cases, the quality of the 5G network coverage may be belter than the quality provided by the other network, i.e., the network through which the existing call is being supported.

In response, the wireless device may attempt to move over to the 5G network. This may involve sending a registration request to the 5G network, which may respond with a registration acceptance. The registration acceptance may include configuration information and other details regarding the 5G network. For example, the registration acceptance may indicate the availability of IMS voice services on the 5G network. However, as described above, this indication of IMS voice services support is sent irrespective of whether EPS Fallback, for Voice or VoNR is supported in the 5G network. In particular, there is no separate indication sent back to the wireless device to indicate support for native VoNR support and EPS Fallback. Accordingly, the indication of IMS voice services support does not allow the wireless device to determine whether VoNR is natively supported.

Figure 3:
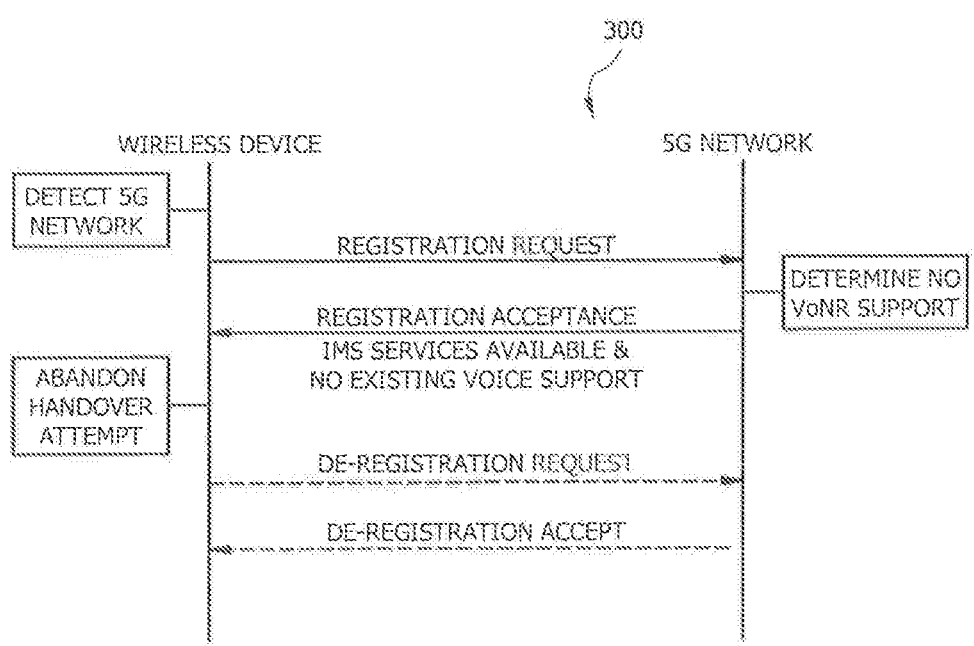
FIG. 3 illustrates a second example signaling diagram between a wireless device involving an attempt to transfer an existing voice call to a new network, in accordance with certain embodiments.

Based on this indication, the wireless device may determine to attempt a handover and transfer the existing voice call to the 5G network. To that end, the wireless device and 5G network may conduct signaling with the 5G network 130 to transfer the existing voice call. If, however, the 5G network does not support VoNR, the 5G network may determine that there are no 5G voice bearer resources on which the existing voice call can be moved. And, as described above, existing network configurations do not provide any way to fallback to the EPS at this later stage (e.g., after the voice call has been established) or indicate the lack of support at an earlier stage. As a result, the existing voice call is dropped in the process of moving to the 5G network. This may have severe drawbacks. For example, the dropped call may be an emergency call or other important time-sensitive voice call. Additionally, re-establishing the dropped call may involve additional network resources to carry the additional signaling. Further, battery life may be reduced if voice calls are dropped and re-established unnecessarily, FIG. 3 illustrates a second example signaling diagram 300 between a wireless device, such as wireless device 110, and a 5G network, according to certain embodiments. Signaling diagram 300 may demonstrate one or more advantages of the new techniques described herein. For example, as in signaling diagram 200, the wireless device may have an existing voice call, e.g., existing voice call 111 via WiFi coverage 120. The wireless device may detect the WiFi coverage fading and detects overlapping available 5G and 4G/LTE network coverage, e.g., 5G network coverage 130 and 4G/LTE network coverage 140. In some embodiments, the 5G network offers belter quality of service and the handover access selection mechanism at the wireless device may prefer 5G network access over 4G network.

Likewise, the wireless device may choose the 5G network and register with the 5G network (e.g., via the 5G core network). In the registration acceptance, the 5G network (e.g., involving the Access and Mobility Management Function (AMF) indicates that IMS voice services are supported. As described above, this indication of IMS voice services support is sent irrespective of whether EPS Fallback for Voice or VoNR is supported in the 5G network.

However, in certain embodiments, the registration acceptance or other signaling involved in the registration process, further indicates that existing voice call cannot be supported. For example, the Registration Accept message from the 5G network to the wireless device may include an explicit or implicit indication that existing voice calls are not supported, e.g., if VoNR is not supported in the 5G network. The indication may be inferred by the UE that if it has an existing voice (or emergency) call and attempts to move to 5G, then the existing voice (emergency) call will drop. In certain embodiments, the indication that existing voice calls cannot be supported is only included in the registration acceptance, e.g., the Registration Accept message, for registration in areas of the 5G coverage where VoNR is not supported natively. In some embodiments, where VoNR is supported natively, the 5G network, e.g., the 5G core AMF may exclude the indication of 'existing voice call cannot be supported' from the registration acceptance. In other embodiments, the 5G network may include an affirmative existing voice call is supported indication in registration acceptance.

Thus, in contrast the wireless device in signaling diagram 200, the wireless device may determine that the 5G network does not support the handover of the existing voice call. The wireless device may then slop the attempt to handover the existing voice call to the 5G network.

In certain embodiments, the wireless device may take further action in response to determining that the 5G network does not support existing voice calls in the handover. In some embodiments, wireless device may determine that it can transfer the existing phone call to another network, such as to EPS if 4G/LTE coverage is present. Further details regarding such a handover are provided below in reference to FIG. 4. In some embodiments, the wireless device may actively de-register from the 5G network if it does not proceed with the handover. For example, the wireless device may send, optionally, a deregistration request to the 5G network and receive a deregistration acceptance from the 5G network. Additional signaling may be contemplated as part of the deregistration process, including signaling within the 5G network, e.g., between a 5G network node providing the 5G network coverage to the wireless device and 5G core functions, such as the AMF. In some embodiments, no additional de-registration actions take place, e.g., no de-registration requests or acceptances. For example, the wireless device may, after determining to abandon the handover to the 5G network, abstain from further signaling with the 5G network and continue signaling with the existing network and/or attaching to another network, e.g., a 4G/LTE network.

Accordingly, signaling diagram 300 describes an improved network interaction for the wireless device with an existing voice call. In particular, the 5G network provides an indication that existing voice calls are not supported in the handover and the wireless device determines not to proceed with the handover to avoid dropping the voice call. In this manner, fewer dropped calls may result, thereby reducing the load on the wireless networks and power consumed by the signaling devices during costly re-establishment processes.

In certain embodiments, the network supporting the existing voice call is a WiFi network. In other embodiments, the contemplated handover is from a 4G/LTE network supporting the existing voice call to a 5G network. In some embodiments, the 5G network does not include N26 interworking support. If N26 interworking is not supported, in some embodiments, the established call on EPS (i.e., on the 4G/LTE network), may be maintained on that network even if the wireless device detects the better 5G coverage. In particular, if N26 support is present, the network may control the mobility of calls between the 4G/LTE network and the 5G network. However, if N26 is not present or not presently configured, the wireless device may control mobility between the 4G/LTE network and the 5G network. In this manner, the wireless device, in the absence of N26 support, may control the potential handover of the existing voice call from a 4G/LTE network and a 5G network. As described further herein, in these circumstances, the wireless device may use an indication from the network to determine that the 5G network does not support VoNR and maintain the existing voice call on the 4G/LTE network.

In particular, wireless device may have an existing voice call on a 4G/LTE network and detects 5G coverage that can offer better quality of service, which may cause the handover access selection mechanism to trigger handover to the 5G network. As in the above description with respect to signaling diagram 300, the wireless device may register with the 5G network and receive an indication that existing voice calls cannot be supported in the registration acceptance, e.g., if the 5G network does not support VoNR and/or N26 interworking support is lacking.

In response, the wireless device may determine to continue with the EPS support of the existing voice call (i.e., through the 4G/LTE coverage). In some embodiments, the wireless may further de-register from the 5G network, which may be triggered by a determination that only EPS fallback is supported in the 5G network based on the provided indication. The wireless device may stay on EPS and keep the existing voice (or emergency) call continues on the 4G/LTE network. In this manner, the dropping of the call may be avoided.

Figure 4:
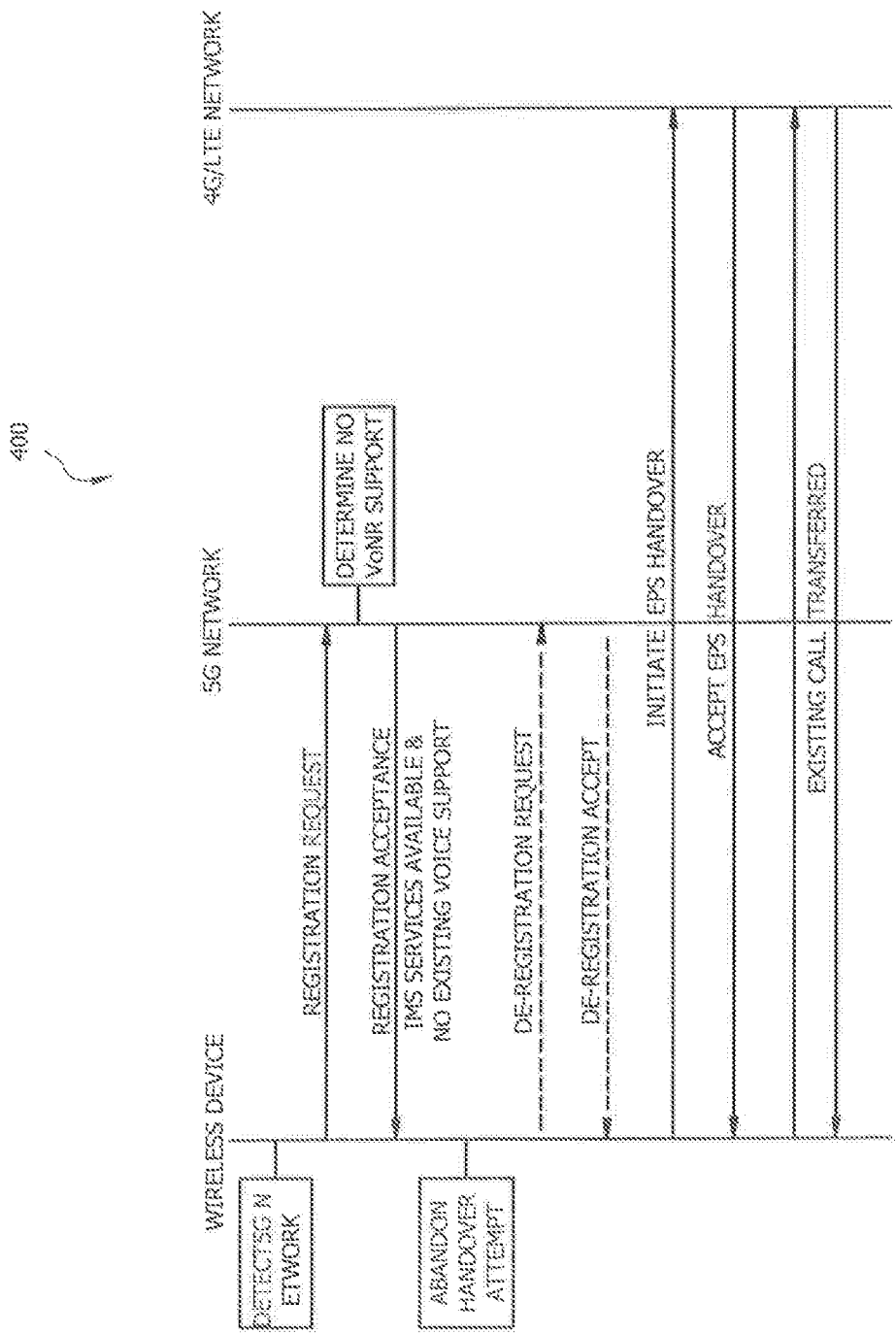
FIG. 4 illustrates a third example signaling diagram between a wireless device involving an attempt to transfer an existing voice call to a new network, in accordance with certain embodiments.

FIG. 4 illustrates a third example signaling diagram 400 between a wireless device, such as wireless device 110, and a 5G network, and a 4G/LTE network. Signaling diagram 400 differs from signaling diagram 300 in that it includes additional signaling to move the existing voice call from its current network (e.g., WiFi network) to the EPS provided in the 4G/LTE network. In this manner, the existing voice call can still be moved to better quality network support, e.g., from fading WiFi coverage 120 to 4G/LTE coverage 140, even if the 5G network may be the first choice by the wireless device, e.g., if it has the best quality of service/signal strength.

The signaling of signaling diagram 400 proceeds as in signaling diagram 300 except after receiving the indication that existing voice calls cannot be supported in the 5G coverage, the wireless device further attempts to transfer or handover the existing voice call to the 4G/LTE network. In certain embodiments, the wireless device attaches to the EPS. For example, the wireless device and 4G network may exchange signaling to request attachment to the EPS and acceptance of the request. Further, additional signaling may be exchanged to move the existing voice (emergency) call to the 4G/LTE network. Accordingly, the indication that existing voice calls are not supported in the 5G network may trigger the abandonment of the handover to the 5G network and cause the wireless device to, instead, transfer the existing voice call the 4G/LTE network. The movement of the existing voice call from another network, e.g., WiFi network, to the TIPS in the 4G/LTE network may be carried out in any suitable manner, including through the use of existing handover procedures.

Accordingly, signaling diagram 400 illustrates how, according to certain embodiments, the indication provided by the 5G network may prevent the dropping of existing voice calls and still allow for the movement of the voice call to a 4G/LTE network, which may provide belter coverage than the current network supporting the voice call. Indeed, the addition of an indication during the registration process when VoNR is not supported provides a robust solution to a technical gap currently existing for New Radio 5G networks in heterogenous network environments or for devices moving to the 5G network from another type of network, such as a WiFi or other radio network.

Figure 5:
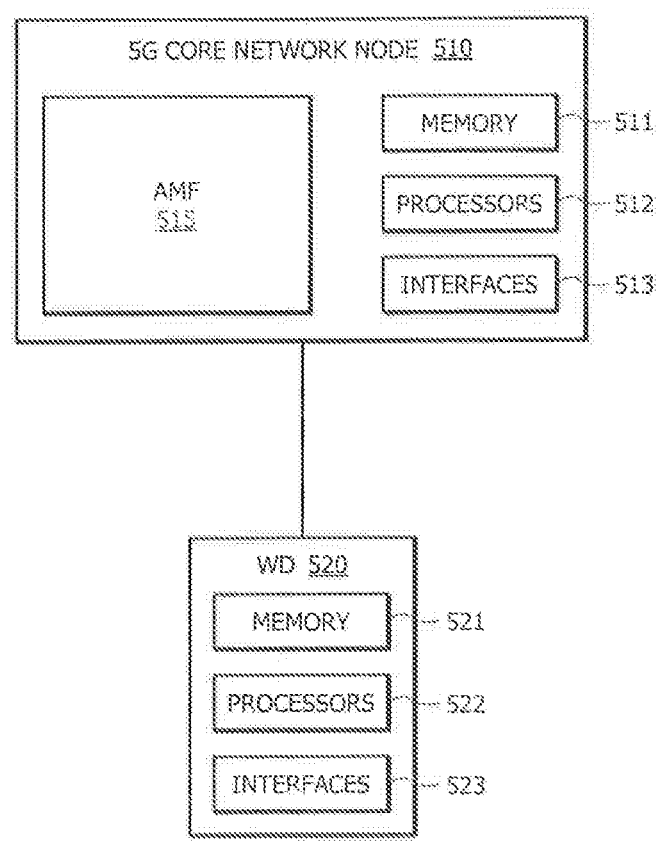
FIG. 5 illustrates a first configuration of a 5G core network and a wireless device for handling voice calls, in accordance with certain embodiments.

FIG. 5 illustrates a first configuration of a 5G core network node 510 and a wireless device 520 for handling voice calls, in accordance with certain embodiments. According to certain embodiments, 5G core network node 510 may include an Access and Mobility Management Function (AMF) 515 implemented on suitable hardware and/or software. Tor example, in some embodiments, 5G core network node 510 may include memory 511, processors 512, and one or more interfaces 513, which may be used to implement one or more functions of 5G core network node 510. In certain embodiments, AMF 515 is configured to carry out one or more of the functions described above in reference to FIGS. 3-4.

For example, AMF 515 may be configured to receive the registration request and respond with the registration acceptance with the indication that no existing voice calls are supported. In particular, AMF 515 may be configured to determine to include the indication in a Registration Accept message prior to the IMS signaling to handover the existing voice call, thereby informing the wireless device that the voice call may be dropped if the handover is pursued. In this manner, 5G core network node 510 may be configured to implement one or more of the described functions to improve the handling of existing voice calls. Additionally, 5G core network node 510 may be communicatively coupled to wireless device 520, e.g., via 5G network node 135, in order to carry out the necessary reception and transmission of messages and/or signals, according to the various embodiments described herein.

Wireless device 520 may be configured in any suitable hardware and/or software that is configured to carry out one or more of the functions described above with respect to wireless device 110 or wireless devices described with respect to FIGS. 3-4. For example, in some embodiments, wireless device 520 may include memory 521, one or more processors 522, and one or more interfaces 523 that implement one or more of the functions described herein. For example, wireless device 520 may be configured to participate in the registration process with a 5G network and receive the indication that existing calls are not supported. In response, wireless device 520 may be configured to abandon the handover attempt and maintain the existing voice call on its current network or move the existing voice call to an overlapping 4G/LTE network (e.g., to the EPS). In this manner, wireless device 520 may be configured to maintain existing voice calls without inadvertent dropping, thereby requiring less re-establishment procedures.

As described above, in certain embodiments, 5G core network node 510 includes memory 511, processor 512, and one or more interfaces 513. Additionally, wireless device 520 may include memory 521, processor 522, and one or more interfaces 523. 5G core network node 510 and/or wireless device 520 may include multiple sets of one or more of the illustrated components for different wireless technologies supported by 5G core network node 510 and/or wireless device 520, such as, for example, GSM, WCDMA, LTE, NR, WiFi, WiMAX, or Bluetooth wireless technologies, just to mention a few. These wireless technologies may be integrated into the same or different chips or set of chips as other components within 5G core network node 510 and/or wireless device 520.

Interfaces 513 and/or 523 may include one or more antennas or antenna arrays, configured to send and/or receive wireless signals. In certain alternative embodiments, interfaces 513 and/or 523 may not include an antenna, but may include an interface for interfacing with an external antenna connectable to 5G core network node 510 or wireless device 520 through one of interfaces 513 and/or 523. Interfaces 513 and/or 523 and/or processor 513 and/or 523 may be configured to perform any receiving or transmitting operations described herein as being performed by 5G core network node 510 and/or wireless device 520, Any information, data and/or signals may be received from a network node and/or another wireless node.

In certain embodiments, interfaces 513 and/or 523 include one or more of radio front end circuitry and an antenna. For example, interfaces 513 and/or 523 may include one or more fillers or amplifiers that is connected to transmission components. In some embodiments, interfaces 513 and/or 523 are configured to receive analog or digital data that is sent out to other nodes or terminal devices via a wireless connection. In some embodiments, interfaces 513 and/or 523 may include circuitry configured to convert data from digital to analog and vice versa. Signals and data received may be passed to processor 512 and/or 522. Accordingly, interfaces 513 and/or 523 may include any suitable interfacing components for receiving and/or transmitting wireless communications.

In certain embodiments, interfaces 513 and/or 523 may also include one or more interfaces for communicating between different components of 5G core network node 510 and/or wireless device 520.

Processor 512 and/or 522 may include be any electronic circuitry, including, but not limited to microprocessors, application specific integrated circuits (ASIC), application specific instruction set processor (ASIP), and/or state machines, that communicatively couples to memory 511 or 521 and controls the operation of 5G core network node 510 or wireless device 520, respectively. Processor 512 and/or 522 may be 8-bit, 16-bit, 32-bit, 64-bit or of any other suitable architecture. Processor 512 and/or 522 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 512 and/or 522 may include other hardware and software that operates to control and process information.

In certain embodiments, Processor 512 and/or 522 executes software stored on memory 511 and/or 521, respectively, to perform any of the functions described herein. For example, processor 512 may control the operation and administration of 5G core network node 510 by processing information received from memory 511, or any external databases, or any other components in the 5G network to which 5G core network node 510 belongs. As another example, processor 522 may control the operation and administration of wireless device 520 by processing information received from memory 521, or any external databases, or any other components in the heterogenous network environment 100. In certain embodiments, processor 512 and/or 522 may be configured to carry out one or more functions of 5G core network node 510 and/or wireless device 520 or any components thereof. Processor 512 and/or 522 may be a programmable logic device, a microcontroller, a microprocessor, any suitable processing device, or any suitable combination of the preceding. Processor 512 and/or 522 is not limited to a single processing device and may encompass multiple processing devices.

In certain embodiments, processor 512 and/or 522 includes one or more of wireless transceiver circuitry, wireless signal processing circuitry, and application processing circuitry. In other embodiments, the processor 512 and/or 522 may include different components and/or different combinations of components. In certain embodiments processor 512 and/or 522 includes a system on a chip. In some embodiments, processor 415 or components thereof may be on a single chip, separate chips, or a set of chips.

Memory 511 and/or 521 may store, either permanently or temporarily, data, operational software, or other information for processor 512 and/or 522. In certain embodiments, memory 511 and/or 521 may store the indication that existing voice calls are supported and/or the information that indicates that VoNR is not supported at the 5G network, or any other information used in handling the potential migration of the existing voice call. Memory 511 and/or 521 may include any one or a combination of volatile or non-volatile local or remote devices suitable for storing information. For example, memory 511 and/or 521 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 511 and/or 521, a disk, a CD, or a flash drive.

In certain embodiments, memory 511 and/or 521 may be operable to store a computer program, software, an application including one or more of logic, rules, code, tables, etc. and/or other instructions capable of being executed by processor 512 and/or 522. In particular embodiments, the software may include an application executable by processor 512 and/or 522 to perform one or more of the functions described herein. In certain embodiments, memory 511 and/or 521 may be or implemented as a NoSQL database. In some embodiments, processor 512 and/or 522 and memory 511 and/or 521 may be considered to be integrated.

In certain embodiments, some or all of the functionality described herein as being performed by 5G core network node 510 and/or wireless device 520 (and wireless device 110) may be provided by processor 512 and/or 522 executing instructions stored on memory 511 and/or 521, which in certain embodiments may be a computer-readable storage medium. In alternative embodiments, some or all of the functionality may be provided by processor 512 and/or 522 without executing instructions stored on a separate or discrete device readable storage medium, such as in a hard-wired manner. In any of those particular embodiments, whether executing instructions stored on a device readable storage medium or not, processor 512 and/or 522 can be configured to perform the described functionality.

Processor 512 and/or 522 may be configured to perform any determining, calculating, or similar operations (e.g., certain obtaining operations) described herein as being performed by 5G core network node 510 and/or wireless device 520 (and wireless device 110). These operations, as performed by processor 512 and/or 522, may include processing information obtained by processor 512 and/or 522 by, for example, converting the obtained information into other information, comparing the obtained information or converted information to information stored by 5G core network node 510 and/or wireless device 520 (and wireless device 110), and/or performing one or more operations based on the obtained information or convened information, and as a result of said processing making a determination.

In particular embodiments, one or more functions described herein relating to wireless device 110, wireless node 520, and/or the wireless node referred to in FIGS. 2-4 may be implemented using one or more interfaces 523, memory 521, and processor 522, their equivalents, or any suitable combination of hardware and software as understood by persons having skill in foe art capable of carrying out one or more functions or methods described herein. Similarly, in particular embodiments, one or more functions described herein relating to foe 5G network described in FIGS. 1-4 and/or 5G core network node 520 may be implemented using one or more interfaces 513, memory 511, and processor 512, their equivalents, or any suitable combination of hardware and software as understood by persons having skill in the art capable of carrying out one or more functions or methods described herein.

Figure 6:
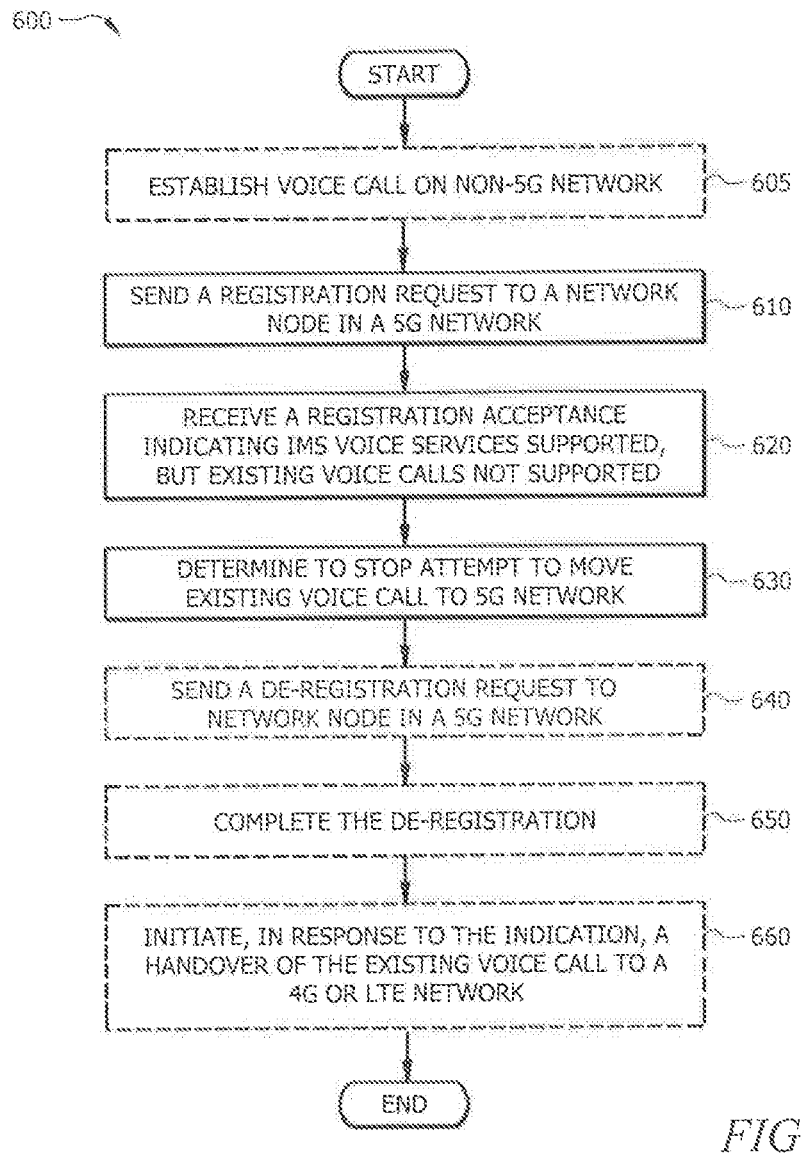
FIG. 6 is a flowchart diagram of an example method in a wireless device for handling existing voice calls in a heterogenous network environment, in accordance with certain embodiments.

FIG. 6 is a flowchart diagram of an example method 600 in a wireless device, such as wireless device 110, 520, and/or wireless devices of FIGS. 3-4, for handling existing voice calls in a heterogenous network environment, such as network environment 100, in accordance with certain embodiments. Method 600 may start at step 610, in which a registration request is sent to a network node in a Next Generation (5G) network, such as 5G network node 135 and/or 5G core network node 520 or another network node within the 5G network containing an AMF. There may be an existing voice call on a different network in the heterogeneous network environment, such as existing voice call 111 on a WiFi network, e.g., access of which is provided through WiFi coverage 120 via WAP 125. In some embodiments, the registration attempt may be triggered by detecting the presence of the 5G network and/or determining that the 5G network would provide better quality of service. Accordingly, the wireless device may attempt to move over to the 5G network and send a registration request to that effect.

At step 620, a registration acceptance is received from the network node in the 5G network. For example, the 5G network may determine to accept the wireless device for potential handover and respond with a Register Accept message. The registration acceptance may include information about the configuration of the 5G network, such as what services are supported on the 5G network. In certain embodiments, the registration acceptance indicates that IMS voice services are supported, but existing voice calls are not supported. For example, there may be an explicit or implicit indication that existing voice calls are not supported, e.g., because the 5G network does not support VoNR. As described herein, the 5G network may first determine whether it supports VoNR before determining whether to include the indication that existing voice calls are not supported (or alternatively abstain from including the indication or include an affirmative indication that existing voice calls are supported).

At step 630, the wireless device determines to stop an attempt to move the existing voice call to the 5G network. For example, the wireless device may determine that it wants to maintain the existing voice call and determine that if the 5G network does not have the required support/configuration, it will not continue to move the voice call in order to avoid dropping the existing voice call. In some embodiments, the wireless device continues to move to the 5G network even though it determines it will result in a dropped call. In this manner, the wireless device may obtain information, e.g., through the indication from the 5G network, on which to determine whether to continue moving to the 5G network from its existing network when it has an existing voice call.

Modifications, additions, or omissions may be made to method 600 depicted in FIG. 6. Method 600 may include more, fewer, or other steps. For example, in certain embodiments, method 600 includes one or more further optional steps 640 and 650. In particular, after the wireless device determines not to continue with handing over the voice call, the wireless device may initiate a de-registration from the 5G network. At step 640, a de-registration request may be sent to a network node in the 5G network based on the indication that existing voice calls are not supported on the 5G network. At step 650, the de-registration of the wireless device from the 5G network is completed, e.g. by receiving an acceptance of the de-registration from the 5G network and/or further signaling between the wireless device and the 5G network. In this manner, the wireless device may de-register from the 5G network and avoid dropping the existing voice call.

According to certain embodiments, method 600 may include optional step 660 (with or without optional steps 640 and 650 described above). At step 660, the wireless device may initiate a handover procedure of the existing voice call to a 4G or LTE network. For example, if the wireless device's existing voice call is supported on a WiFi network, the wireless device may detect the 5G network and overlapping coverage in a 4G/LTE network. In response to the registration acceptance indicating existing voice calls are not supported on the 5G network, the wireless device may continue to try to move the existing voice call, but instead of to the 5G network, the wireless device may initiate a handover to the EPS on the 4G/LTE network that also provide coverage. Accordingly, even if the 5G coverage is better than the 4G/LTE coverage, the wireless device, triggered by the indication, may avoid moving the existing voice call to the 5G network and instead, move it to the 4G/LTE network where it will not be dropped during the attempted transfer. Additionally, in some embodiments, step 660 may occur before optional steps 640 and 650. In other embodiments, step 660 may occur after optional steps 640 and 650.

Additionally, in certain embodiments, method 600 includes optional step 605 prior to sending the registration request to the 5G network. At step 605, the wireless device establishes a voice call on a non-5G network. For example, the wireless device may initiate a voice call on a WiFi network. The wireless device may establish the voice call on the WiFi network due to the coverage of the WiFi network being better than any other available networks or the only network coverage available for the voice call. The wireless device may further coordinate with the WiFi network, e.g., through a wireless access point, router, etc., to establish, the voice call. The established voice call referred to in method 600 may be the voice call established on this different non-5G network. In this manner, the wireless device may establish the voice call on one network and attempt to move the voice call, e.g., due to the mobility of the wireless device, to another network, such as the 5G network.

Additionally, steps may be performed in parallel or in any suitable order. While discussed as a wireless device, such as wireless devices 110, 520 and those described in FIGS. 3-4 as performing certain steps, any suitable component of described wireless devices may perform one or more steps of the methods. Additionally, method 600 may include any suitable step to carry out any of the described functions of the wireless devices described herein. Further, any of steps of method 600 may computerized and/or carried out using hardware, such as processor 522 of wireless device 520, or any other suitable system implementing one or more components of wireless device 110 and the wireless device(s) described with respect to FIGS. 3-4.

Figure 7:
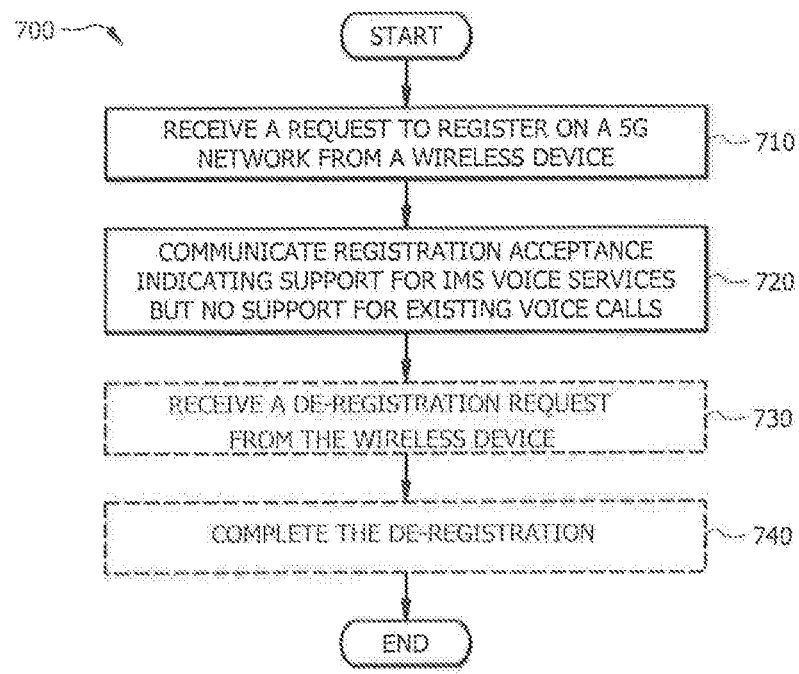
FIGURE 7 is a flowchart diagram of an example method in a wireless network for handling attempted transfers of existing voice calls, in accordance with certain embodiments.

FIG. 7 is a flowchart diagram of an example method 700 in a wireless network, such as 5G core network 510, and/or in the 5G network for which 5G network coverage 130 is provided by 5G network node 135 and/or the 5G networks described herein with respect to FIGS. 3-4, handling attempted transfers of existing voice calls, in accordance with certain embodiments. Method 700 may begin with step 710, in which the 5G network receives a request to register on the network from a wireless device. For example, the wireless device may indicate information regarding itself, e.g., its identification and/or configuration, and request access onto the 5G network.

At step 720, the 5G network may respond by communicating a registration acceptance to the wireless device. In certain embodiments, the 5G network may not support VoNR even if it supports IMS voice services. Accordingly, the registration acceptance, in certain embodiments, includes not only an indication that IMS voice service are supported, but also, that existing voice calls are not supported, e.g., to be transferred to the 5G network. In this manner, the 5G network may notify at this early stage that attempting to transfer an existing voice call may or will result in the call being dropped. In some embodiments, the 5G network abstains from including that indication when it does support VoNR or has 5G resources to support the transfer of the existing voice call. In some embodiments, the 5G network affirmatively indicates when the 5G network supports VoNR. The indication may be used by the wireless device to determine not to attempt to move the existing voice call to the 5G network. For example, the wireless device may maintain the voice call on its currently-supporting, network or attempt to move it to another network, such as to EPS in a 4G/LTE network. In this manner, the provided indication prevents dropped voice calls, thereby reducing resources required to re-establish voice calls. Further, especially in the case of emergency calls, the prevention of dropped calls may be a matter of life or death.

Modifications, additions, or omissions may be made to method 700 depicted in FIG. 7. Method 700 may include more, fewer, or other steps. For example, in certain embodiments, method 700 includes one or more further optional steps 730 and 740. In particular. The wireless device may determine, based on the indication that existing voice calls are not supported, that it does not want to continue with handing over the voice call to the 5G network. Accordingly, at step 730, a de-registration request may be received by the 5G network from the wireless device based on the indication that existing voice calls are not supported on the 5G network. At step 740, the de-registration of the wireless device from the 5G network is completed, e.g. by sending an acceptance of the de-registration from the 5G network and/or further signaling between the wireless device and the 5G network. In this manner, the wireless device may be de-registered from the 5G network, and the dropping the existing voice call may be avoided.

Additionally, steps may be performed in parallel or in any suitable order. While discussed as a 5G network, e.g., via 5G network node 135 and/or 5G core network node 510 and/or the 5G networks described with respect to FIGS. 3-4, as performing certain steps, any suitable component of said networks and/or network nodes. Additionally, method 700 may include any suitable step to carry out any of the described functions of the 5G networks described herein. Further, any of steps of method 700 may computerized and/or carried out using hardware, such as processor 512 of 5G core network node 520, or any other suitable system implementing one or more components of the 5G networks and/or network nodes described herein.

Although wireless nodes are described herein with reference to their use in particular wireless environments, e.g., wireless networks using the WiFi standard or radio networks such as an LTE or 5G NR network, the techniques and technical improvements thereof are also applicable to any suitable environment where native support for existing voice calls is not supported in a network onto which an existing voice call is considered for handover.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A wireless device in a heterogeneous network environment, the wireless device comprising:
   one or more interfaces configured to receive wireless transmissions;
   a memory comprising instructions; and
   a hardware processor;
   wherein the wireless device, when executing the instructions at the hardware processor, is configured to:
   send a registration request to a network node in a New Radio, 5G, network, wherein the wireless device has an existing voice call on a different network in the heterogeneous network environment; and
   receive a registration acceptance from the network node in the 5G network, wherein the registration acceptance indicates that IMS voice services are supported, but existing voice calls are not supported; and
   determine to stop an attempt to move the existing voice call to the 5G network.

2. The wireless device of claim 1, wherein device wireless device is further configured to:
   send a de-registration request to the network node in the 5G network based on the indication that existing voice calls are not supported on the 5G network; and
   complete the de-registration of the wireless device from the 5G network.

3. The wireless device of claim 1, wherein the existing voice call is on a WIFI network in the heterogenous network environment.

4. The wireless device of claim 3, wherein the heterogenous network environment comprises a 4G or Long-term Evolution, LTE, network; and
   the wireless device is further configured to initiate, in response to the registration acceptance indicating existing voice calls are not supported on the 5G network, a handover procedure of the existing voice calf from the WIFI network to the 4G or LTE network.

5. The wireless device of claim 1, wherein:
   the existing voice call is on a 4G or LTE network in the heterogenous network environment; and
   the wireless device is further configured to maintain the existing voice call on the 4G or LTE network in response to receiving the registration acceptance indicating that existing voice calls are not supported on the 5G network.

6. The wireless device of claim 1, wherein the registration acceptance indicates that existing voice calls are not supported on the 5G network in the heterogenous network environment if the 5G network does not support VoNR.

7. The wireless device of claim 1, wherein the wireless device is further configured to:
   detect coverage of the 5G network in the heterogenous network environment having higher quality of service than the different network; and
   based on the detection, determine to attempt to move the existing voice call from the different network to the 5G network.

8. The wireless device of claim 1, wherein the wireless device is further configured to:
   before sending the registration request to the network node in tire 5G network, establish the existing voice call in the different network, the different network being a WIFI network.

9. A method for handling a voice call in a heterogeneous network environment by a wireless device, the method comprising:
   sending a registration request to a network node in a Next Generation (5G) network, wherein the wireless device has an existing voice call on a different network in the heterogeneous network environment; and
   receiving a registration acceptance from the network node in the 5G network, wherein the registration acceptance indicates that IMS voice services are supported, but existing voice calls are not supported; and
   determining to stop an attempt to move the existing voice call to the 5G network.

10. The method of claim 9, further comprising:
    sending a de-registration request to a network node in the 5G network based on the indication that existing voice calls are not supported on the 5G network; and
    completing the de-registration of the wireless device from the 5G network.

11. The method of claim 9, wherein the existing voice call is on a WIFI network in the heterogenous network environment.

12. The method of claim 11, wherein the heterogenous network environment comprises a 4G or LTE Network; and
    the method further comprises, initiating, in response to the registration acceptance indicating existing voice calls are not supported on the 5G network, a handover procedure of the existing voice call from the WIFI network to the 4G or LTE network.

13. The method of claim 9, wherein the existing voice call is on a 4G or LTE network in the heterogenous network environment; and
    the method further comprises maintaining the existing voice call on the 4G or LTE network in response to receiving the registration acceptance indicating that existing voice calls are not supported on the 5G network.

14. The method of claim 9, wherein the registration acceptance indicates that existing voice calls are not supported on the 5G network in the heterogenous network environment if the 5G network does not support VoNR.

15. The method of claim 9, further comprising:
    detecting coverage of the 5G network in the heterogenous network environment having higher quality of service than the different network; and based on the detection, determining to attempt to move the existing voice call from the different network, to the 5G network.

16. The method of claim 9, wherein the wireless device is further configured to:
before sending the registration request to the network node in the 5G network, establish the existing voice call in the different network, the different network being a WIFI network.

17. A network node in a heterogeneous network environment, the core network comprising:
one or more interlaces configured to receive wireless transmissions;
a memory comprising instructions; and
a hardware processor;
wherein the network node, when executing the instructions at the hardware processor, is configured to:
receive a request from a wireless device to register with a Next Generation (5G) network in the heterogenous network environment, wherein the wireless device has an existing voice call on a different network in the heterogeneous network environment; and
communicate a registration acceptance to the wireless device, wherein the registration acceptance indicates that IMS voice services are supported, but existing voice calls are not supported on the 5G network;
wherein the wireless device does not attempt to move the existing voice call to the 5G network.

18. The network node of claim 17, wherein the network node is further configured to:
receive a de-registration request from the wireless device based on the indication that existing voice calls are not supported; and
complete the de-registration of the wireless device.

19. The network node of claim 17, wherein tire existing voice call is on a WIFI network in the heterogenous network environment.

20. The network node of claim 19, wherein:
the heterogenous network environment comprises a 4G or LTE Network; and
the wireless device, in response to the registration acceptance indicating existing voice calls are not supported on the 5G network, initiates a handover procedure of the existing voice call from the WIFI network to the 4G or LTE network.

21. The network node of claim 17, wherein the existing voice call is on a 4G or LTE network in the heterogenous network environment and the wireless device maintains the existing voice call on the 4G or LTE network in response to receiving the registration acceptance indicating that existing voice calls are not supported on the 5G network.

22. The network node of claim 17, wherein the network node is further configured to determine to indicate that existing voice calls are not supported on the 5G network in the heterogenous network environment if the 5G network does not support VoNR.

23. A method for handling a voice call in a heterogenous network environment, the method comprising:
receiving a request from a wireless device to register with a Next Generation (5G) network in the heterogenous network environment, wherein the wireless device has an existing voice call on a different network in the heterogeneous network environment; and
communicating a registration acceptance to the wireless device, wherein the registration acceptance indicates that IMS voice services are supported, but existing voice calls are not supported on the 5G network;
wherein the wireless device does not attempt to move the existing voice call to the 5G network.

24. The method of claim 23, further comprising:
receiving a de-registration request from the wireless device based on the indication that existing voice calls are not supported; and
completing the de-registration of the wireless device.

25. The method of claim 23, wherein the existing voice call is on a WIFI network in the heterogenous network environment.

26. The method of claim 25, wherein:
the heterogenous network environment comprises a 4G or LTE Network; and
the wireless device, in response to the registration acceptance indicating existing voice calls are not supported on the 5G network, initiates a handover procedure of the existing voice call from the WIFI network to the 4G or LTE network.

27. The method of claim 23, wherein the existing voice call is on a 4G or LTE network in the heterogenous network environment and the wireless device maintains the existing voice call on the 4G or LTE network in response to receiving the registration acceptance indicating that existing voice calls are not supported on the 5G network.

28. The method of claim 23, further comprising determining to indicate that existing voice calls are not supported on the 5G network in the heterogenous network environment if the 5G network does not support VoNR.

* * * * *

UNITED STATES PATENT AND TRADEMARK OFFICE
CERTIFICATE OF CORRECTION

| | | |
|---|---|---|
| PATENT NO. | : 11,071,036 B2 | Page 1 of 1 |
| APPLICATION NO. | : 16/662275 | |
| DATED | : July 20, 2021 | |
| INVENTOR(S) | : Subrata Mukherjee et al. | |

It is certified that error appears in the above-identified patent and that said Letters Patent is hereby corrected as shown below:

On the Title Page

In item (73), under "ASSIGNEE", delete "Cisco Techneiogy, Inc." and insert -- Cisco Technology, Inc. --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*